US012726764B2

(12) United States Patent
Dodd

(10) Patent No.: US 12,726,764 B2
(45) Date of Patent: Sep. 1, 2026

(54) COMPRESSION DRIVERS

(71) Applicant: GP Acoustics (UK) Limited, Maidstone (GB)

(72) Inventor: Mark Alexander Dodd, Budleigh Salterton (GB)

(73) Assignee: GP ACOUSTICS (UK) LIMITED, Maidstone (GB)

( * ) Notice: Subject to any disclaimer, the term of this patent is extended or adjusted under 35 U.S.C. 154(b) by 87 days.

(21) Appl. No.: 18/953,710

(22) Filed: Nov. 20, 2024

(65) Prior Publication Data

US 2025/0168563 A1 May 22, 2025

(30) Foreign Application Priority Data

Nov. 21, 2023 (GB) ...................................... 2317795

(51) Int. Cl.
*H04R 3/04* (2006.01)

(52) U.S. Cl.
CPC ..................................... *H04R 3/04* (2013.01)

(58) Field of Classification Search
CPC ... H04R 7/22; H04R 7/04; H04R 1/24; H04R 1/28; H04R 7/00; H04R 2201/34; H04R 2400/13; H04R 1/345; H04R 1/20; H04R 1/22; H04R 1/227; H04R 1/26; H04R 1/2803; H04R 1/2807; H04R 1/2811;
(Continued)

(56) References Cited

U.S. PATENT DOCUMENTS 4,438,297 A 3/1984 Kawamura
2010/0014704 A1 1/2010 Goschin et al.
(Continued)

FOREIGN PATENT DOCUMENTS

GB 2437125 A 10/2007
JP H08126092 A 5/1996
JP 2006074410 A * 3/2006

OTHER PUBLICATIONS

Search Report issued for GB patent application Serial No. 2317795.9 dated Mar. 28, 2024.

*Primary Examiner* — Carolyn R Edwards
*Assistant Examiner* — Julie X Dang
(74) *Attorney, Agent, or Firm* — Westman, Champlin & Koehler; Z. Peter Sawicki; Amanda M. Prose

(57) ABSTRACT

A compression driver comprising a diaphragm having a concave sound-radiating surface, a phase plug having a convex surface shaped to match the concave surface of the diaphragm, and a magnet, the diaphragm being connected to a voice coil former along a line forming a closed loop, the diaphragm and former being adapted to reciprocate along an axis, the diaphragm, phase plug, voice coil former together being configured to form: a compression cavity; a surround cavity; and a magnet cavity, in which an abstract surface can be generated by rotating about the axis an abstract line extending from the diaphragm on the line of the closed loop to the convex surface of the phase plug perpendicularly thereto, and in which a plurality of holes are formed in the voice coil former around at least a part of its circumference and pass through the voice coil former to connect the compression cavity with the surround cavity, the holes having a total area substantially the same as the area of the abstract surface.

14 Claims, 8 Drawing Sheets

(58) Field of Classification Search
CPC .... H04R 1/869; H04R 1/2873; H04R 1/2884; H04R 1/2888; H04R 1/30; H04R 1/60
USPC ....... 381/342, 343, 340, 431, 399, 423, 408, 381/337, 351
See application file for complete search history.

(56) References Cited

U.S. PATENT DOCUMENTS

| | | | | |
|---|---|---|---|---|
| 2011/0085692 | A1* | 4/2011 | Voishvillo | H04R 1/345<br>381/343 |
| 2015/0373445 | A1* | 12/2015 | Voishvillo | H04R 1/30<br>381/150 |
| 2016/0014503 | A1* | 1/2016 | Oclee-Brown | H04R 1/30<br>381/343 |
| 2018/0255394 | A1* | 9/2018 | Colich | H04R 1/2807 |
| 2018/0255399 | A1* | 9/2018 | Voishvillo | H04R 1/28 |
| 2021/0266659 | A1 | 8/2021 | Zhu et al. | |
| 2022/0286769 | A1* | 9/2022 | Casadei | H04R 1/30 |

* cited by examiner

Prior Art

COMPRESSION DRIVERS

FIELD OF THE INVENTION

The present invention relates to the field of compression drivers, and in particular to compression driver voice coil formers and to compression drivers incorporating such voice coil former.

BACKGROUND ART

Compression drivers are a type of diaphragm loudspeaker which generates the sound in a horn loudspeaker. A compression driver is attached to the throat of an acoustic horn, a widening duct which serves to radiate the sound efficiently into the air. Compression drivers generally comprise a diaphragm which is connected to a voice coil driver, with the voice coil driver being placed in a magnetic field usually provided by one or more permanent magnets. Passing an audio signal current through the voice coil induces a force, causing the voice coil driver to reciprocate between the poles of the magnet, and hence the diaphragm to vibrate and so radiate acoustic waves. The voice coil driver usually comprises a voice coil former, around which an electrically conductive wire is coiled; the former and wire coil form a unitary item and they vibrate as one. Voice coil formers are usually (but not always) cylindrical. The area of the loudspeaker diaphragm is usually significantly larger than the throat aperture of the horn so that the compression driver provides high sound pressures. Horn-loaded compression drivers can be very efficient, having around 10 times the efficiency of a direct-radiating cone loudspeaker. They are used as midrange and high frequency, tweeter drivers in high power sound reinforcement loudspeakers, and in reflex or folded-horn loudspeakers in megaphones and public address systems.

Compression drivers often use a phase plug that collects the sound radiated by the sound-radiating side of the diaphragm; one common arrangement is to use an axisymmetrically-curved diaphragm, such as a segment of a sphere, with a phase plug which is configured so as to conform to the sound-radiating side of the diaphragm (a spherical diaphragm may be adapted to radiate from either its convex or its concave surface, in which case the surface of the phase plug would be spherically concave or convex, respectively). The phase plug usually has channels passing through it to collect the sound radiated by the diaphragm and to channel it towards the horn; the simple spherical geometry allows the channels to be of equal length.

FIG. 1 shows a conventional compression driver 1 in partial cross-section so as to illustrate some of the features to which the present invention relates; the diaphragm 3 is shaped as part of a sphere and adapted to radiate sound from its concave surface (downwardly in the drawing, in the direction of the arrow A), and the phase plug 5 has a convex spherical surface adjacent the diaphragm 3, and channels 7 passing through it to channel sound downwardly towards the horn (not shown). Between the diaphragm 3 and the surface of the phase plug 5 is the compression cavity 9, and a surround cavity 11 is bounded by the outside of the voice coil former 13, the inside of the magnet 15 and the lower side of the outer edge of the diaphragm outside the voice coil former 13. There is a magnetic gap 17 at the top of the magnet 15 between the magnet 15 and the outer surface of the voice coil former 13 (on a different part of which a voice coil (not shown in FIG. 1 for clarity, but shown in FIGS. 2*b*, 2*c*, 4*a* and 4*b* as reference 23) is wound), and this opens into to a former cavity 19 which extends downwardly between the outside of the voice coil former 13 and the magnet 15 leading to a magnet cavity 21.

Ferrofluid is often used in loudspeakers to allow the voice coil to dissipate heat more effectively, resulting in longer tweeter life; using ferrofluid in the magnetic gap between the magnets and the voice coil former forms a seal preventing sound passing into the magnetic gap. This seal results in a compression cavity between diaphragm and phase plug which is essentially a spherical cap with a typical thickness of about 0.4 mm. Sound is radiated into the compression cavity due to the axial motion of the diaphragm and exits the cavity through the channels in the phase plug, which are most often annular. The channels load the cavity by an amount dependent on their area and each channel will excite radial modes in the compression cavity depending on their diameter and area. Choosing the correct area and diameter for each of the channels allows the sum of the modal excitation to be close to zero. Methods to achieve this are described in our patent GB2437125.

Not all compression drivers use ferrofluid and in these compression drivers the compression cavity is also loaded by the narrow channel within the magnetic gap between the voice coil and the magnetic poles (i.e. the former cavity 19 in FIG. 1). The acoustic impedance of the voice coil gap and the former cavity is highly irregular due to the volumes of air in the magnet cavity and in the surround cavity which result in significant Helmholtz type resonances. Furthermore, the surround radiates additional sound through the magnetic gap. Both effects result in modal excitation which is frequency dependent, making the methods for minimizing modal excitation ineffective. The paper, "Boundary conditions of the dome compression chamber in horn drivers," A. Voishvillo, AES Express Paper 46, (2022 October) concludes that for drivers with the voice coil cavity on the outside diameter of the compression cavity it is not possible to balance the modal excitation and thus minimize modal excitation.

Sound radiated from the concave side of the diaphragm in the compression cavity exits through phase plug channels which lead to a short flare and an exit where the horn is connected. However, the gap between the centre pole and the inner diameter of the voice coil acts as an additional exit and removes the possibility of suppressing resonances by balancing the cavity mode excitation (A. Voishvillo, ibid.). The magnet cavity and surround cavity, and the acoustic masses formed by the narrow gaps between coil and poles coil cause several resonances. In a further complication the surround radiates into the cavity behind it and the sound is transmitted through the acoustic filter formed by the masses and compliance. The irregular input to the compression cavity further exacerbates the response irregularities.

The conventional design approach requires the former to be sealed to contain the sound in the compression cavity and this is invariably the case for compression drivers radiating from the concave side of the diaphragm to which a voice coil is attached.

SUMMARY OF THE INVENTION

The present invention follows from the realisation that adopting an alternative approach to the conventional design of compression drivers can produce advantageous results. Thus, the present invention provides a compression driver for connection to the throat of an acoustic horn, the compression driver comprising a diaphragm having a concave sound-radiating surface, a phase plug having a convex surface shaped complementarily to match the concave surface of the diaphragm, and a magnet, the diaphragm being connected to a voice coil former along a line forming a closed loop and which lies in a plane, the diaphragm and former being adapted to reciprocate along an axis, the diaphragm, phase plug, voice coil former together being configured to form: a compression cavity between the concave surface of the diaphragm and the convex surface of the phase plug; a surround cavity bounded by an outer surface of the voice coil former, an inner surface of the magnet and an edge side of the diaphragm outside the voice coil former; a magnetic gap transverse to the axis between outer and inner parts of the magnet adjacent the diaphragm through which magnetic gap the voice coil former reciprocates, opening into a voice coil former cavity which extends along the axis away from the magnetic gap, the voice coil former cavity having an outer part extending between the outside of the voice coil former and the magnet and an inner part extending between the inside of the voice coil former and the phase plug, the voice coil former cavity leading from the magnetic gap to a magnet cavity, in which an abstract surface can be generated by rotating about the axis an abstract line extending from the diaphragm on the line of the closed loop to the convex surface of the phase plug perpendicularly thereto, and in which a plurality of holes are formed in the voice coil former around at least a part of its circumference and pass through the voice coil former to connect the compression cavity with the surround cavity, the holes having a total area substantially the same as or greater than the area of the abstract surface.

In the case of a circular, curved diaphragm it will be understood that the abstract surface will be conical (that is, shaped as a frustum of a cone), and that the term "perpendicularly thereto" means perpendicular to both curved surfaces when these are complementarily shaped, but if the two surfaces are not exactly the same shape at the juncture of the diaphragm and former then the term means perpendicular to the convex surface of the phase plug only.

By introducing holes or perforations which pass through the voice coil former with similar area to the cavity cross section adjacent to the diaphragm the compression cavity may be extended and the path through the magnet gaps bypassed by a lower impedance, greatly reducing the gap excitation. Suppressing modes in the extended cavity is now possible, depending on the geometry of the surround cavity and the surround/cavity widths. Adjoining the coil, the surround part of this extended cavity should have similar spacing to the diaphragm-phase plug spacing. The axial distance between the diaphragm and phase plug should be equal to the displacement of the diaphragm where it is displaced from the phase plug by the nominal displacement. The extended cavity should preferably thin from this thickness adjacent the former to as near to zero as practical to minimize excitation of cavity modes. It is preferred that the total area of the holes is the same as the area of the magnetic gap, but the total area of the holes could be 5%, 10% or even 15% greater or smaller than the area of the magnetic gap without significantly affecting performance.

As stated above, the length of the surround cavity in the axial direction may be substantially the same as the length of the compression cavity in the axial direction, but the length of the surround cavity could be 5%, 10% or even 15% greater or smaller than the length of the compression cavity.

Preferably, the length of the surround cavity in the axial direction reduces as the surround cavity extends outwardly from the voice coil former in a direction transverse to the axis; this minimizes excitation of cavity modes.

The holes may extend axially by a distance sufficient that at least a part of the holes is contained within the voice coil cavity. Extending the holes into the voice coil gap a short distance permits the ideal area to be achieved sufficiently closely to allow the compression cavity and the surround cavity to behave as a single cavity. The surround cavity should be narrow enough to allow all of the holes to be inside the voice coil cavity as the voice coil former reciprocates.

Hollow channels may be provided allowing the magnet cavity to communicate directly with the throat of the horn. For example, blocking off the magnet cavity and adding holes so as to transmit the sound through the gap to the throat makes the magnetic gap into another exit channel for sound. In this case it is preferable to match the flare rate of the other channels in the phase plug. This approach is similar to the use of the gap as a phase corrector channel in U.S. Pat. No. 5,117,462, but has the benefit of allowing the magnetic flux to pass through the iron material of the driver rather than through air in the channel extending from the magnetic gap.

The channels may have inlets located in the compression cavity and outlets located in the throat of the horn, the inlets being located at a nodal point of a chosen mode in the compression cavity. The compression driver may further comprise a moulding locatable within the surround cavity and effective to modify the axial extent of the surround cavity adjacent the magnetic gap and/or to vary the radial area of the surround cavity so that it decreases in an outward direction.

The present invention may be combined with the features set out in our co-pending patent application, No. GB2317791.8, which provide axial mechanical compliance to voice coil drivers as a means of adapting loudspeaker frequency response. In compression driver loudspeakers, a vibration diaphragm is attached to a voice coil driver, and the voice coil driver is placed in a magnetic field usually provided by one or more permanent magnets. By passing an alternating current through the voice coil a force is induced, causing the voice coil driver to reciprocate and hence the diaphragm to vibrate and so radiate acoustic waves. The voice coil driver comprises a voice coil former around which an electrically conductive wire is coiled; the former and wire coil form a unitary item and they vibrate as one. Voice coil formers are usually (but not always) cylindrical. In some applications, where mass is critical and/or space is limited, voice coil formers are made of materials such as titanium or Nomex (Nomex is a trade mark of DuPont Safety & Construction, inc., of Delaware, USA). Titanium voice coil formers are normally formed from a flat strip of material which is rolled into a cylindrical shape; usually the axial ends of the rolled strip are not joined together, which leaves a thin axial gap extending along the length of the voice coil former, across which circumferential forces cannot be balanced by symmetry. Consequently the 'hoop' stiffness which acts on circumferential forces due to axisymmetry is greatly reduced near the gap in the former.

Our co-pending application, No. GB2317791.8, discloses an arrangement which introduces mechanical axial compliancy into a voice coil former which is relatively simple, easily manufactured and easily "tuneable", in particular (but not exclusively) for loudspeakers in which mass is critical and/or space is limited, such as in compression drivers. It describes a mechanical axial compliance arrangement which can be tuned relatively easily to account for voice coil formers which have been rolled into shape and have a thin axial gap extending along the length of the voice coil former. Compression drivers benefit from introducing a resonance, where the mass results in a 6 db/Octave low pass filter typically from 2-3 kHz. In many cases the output level in the upper part of the response is lower than desired and introducing a resonance by making the former axially compliant produces a more desirable response.

A relatively simple mechanical compliance arrangement can be provided by exploiting the relatively easily calculated effects of cantilevers, and certain arrangements of cantilevers can be used to form a voice coil driver with a significantly improved overall performance compared to conventional systems.

The voice coil former for a compression driver may have at least two axially-spaced rows of holes extending circumferentially or at least partly circumferentially around the axis, adjacent rows being rotated relative to each other such that adjacent holes overlap circumferentially to form arcuate spars therebetween disposed circumferentially around the voice coil former, each arcuate spar being adapted to flex, cantilever-fashion, in an axial direction in response to the voice coil former being driven axially and allowing the axial length of the voice coil former to vary. The overlap between adjacent holes in adjacent rows may be such that the length of the arcuate spars is at least 25% of the circumferential length of the adjacent holes. One or more of these at least two rows of holes may comprise the holes which pass through the voice coil former with similar area to the abstract surface, or they may be in addition to them. Where one or more rows of holes is in addition to the holes which pass through the voice coil former with similar area to the abstract surface, these one or more rows are preferably located axially within the voice coil cavity.

The arcuate spars form a structural link transmitting the force between the part of the former on which the voice coil is wound and the part of the former attached to the diaphragm. The spars flex in a spring-like manner and when deflected a restoring force is produced making the arrangement behave as a spring linking the coil and diaphragm in a similar manner to a corrugation on a former. A circumferential alignment of the spars provides increased flexibility when compared to an axial spar.

The spars are manufactured by making a plurality of perforations, or holes, in the former, by removing material from the former so one part of the former is linked by means of the circumferential array of flexing spars to the other part of the former, which is joined to the diaphragm. By varying the length, axial depth, location, orientation or number of spars the axial compliance may be varied over a large range of values allowing the desired axial compliance to be achieved. The length of the spars may be 30%, 35% or 40% of the circumferential length of the adjacent holes; the longer the spars, the more they can bend under a given axial load and the more compliance is introduced into the voice coil former. The overlap must be less than 50%, or successive slots will merge with one another and will create a clean break in the former; a maximum overlap of 40% is preferred so that the circumferential dimension of the axially-extending part between adjacent holes is sufficiently stiff. Depending on the type of material to be removed, press tool forming, laser cutting, precision photoetching, high accuracy microjet water cutting, plasma cutting, or micro-milling are possible manufacturing methods. Further, these spars can be varied (in location, size, shape or orientation, for example) so as readily to compensate for varying circumferential effects resulting from the axial gap where the former is shaped by rolling, and/or to vary the axial stiffness of the former at different points around its circumference. In general, the longer a spar is, the greater are the manufacturing tolerances which achieve an acceptable variation in response; this allows economic manufacture of the voice coil former.

The holes/perforations may extend circumferentially or at least partly circumferentially or at least having a part with a circumferentially directed component around the axis, the arcuate spars being formed along at least a part of each hole. In this case, a single row of holes may provide spars to give the former the required axial compliance. There may be one, two or any number of circumferential rows of holes extending around the axis, the holes being oriented and/or shaped so as form arcuate spars adapted to flex, cantilever-fashion.

There may be two circumferential rows of holes extending around the axis and spaced axially so that the voice coil former between holes in adjacent rows forms the arcuate spars. Such an arrangement, with two rows of holes, is both simple to manufacture and provides spars which give axial mechanical compliance which is relatively easily calculated using Finite Element Method (FEM) analysis; it is also most easily tuned to accommodate non-axisymmetry (presence of an axial gap) or to provide axial compliance which is itself non-axisymmetric.

The holes which are located axially between the compression cavity and the surround cavity provide air venting; where some of the holes or perforations are located axially within the voice coil cavity at least some of these may be filled with either a damping material which is sound absorbent, and more flexible than the material of which the voice coil former is made, to provide damping of air flow through the perforations, and/or at least some of the perforations may be covered with a flexible material which is impervious to air (and more flexible than the material of which the voice coil former is made) to prevent air flow through the holes, according to the particular application.

The holes may be of substantially the same shape, which ensures that all the spars are similar, making for ease of manufacture and allowing relatively easy calculation of the axial compliance effects of the spars. Alternatively, the holes may be of different shapes, which may be helpful in tuning axial compliance circumferentially, and/or for differentiating the holes which allow airflow and acoustic communication between compression cavity and the surround cavity and the holes that are within the voice coil cavity and may or may not allow airflow and acoustic communication between the outer and inner parts of the voice coil former cavity.

The holes may be of substantially the same size, which ensures that all the spars are similar, making for ease of manufacture and allowing relatively easy calculation of the axial compliance effects of the spars. Alternatively, the holes may be of different sizes, and/or of different circumferential lengths, which may be helpful in tuning axial compliance circumferentially.

The holes may be separated circumferentially by substantially the same distance circumferentially and/or axially, which ensures that all the spars are similar, making for ease of manufacture and allowing relatively easy calculation of the axial compliance effects of the spars. Alternatively, the holes may be separated by different distances, which may be helpful in tuning axial compliance circumferentially.

The holes may be oriented similarly, which ensures that all the spars are similar, making for ease of manufacture and allowing relatively easy calculation of the axial compliance effects of the spars. Alternatively, the holes may be oriented differently, which may be helpful in tuning axial compliance circumferentially.

BRIEF DESCRIPTION OF THE DRAWINGS

The invention will now be described by way of example and with reference to the accompanying figures, in which.

DETAILED DESCRIPTION OF THE EMBODIMENTS

Figure 1:
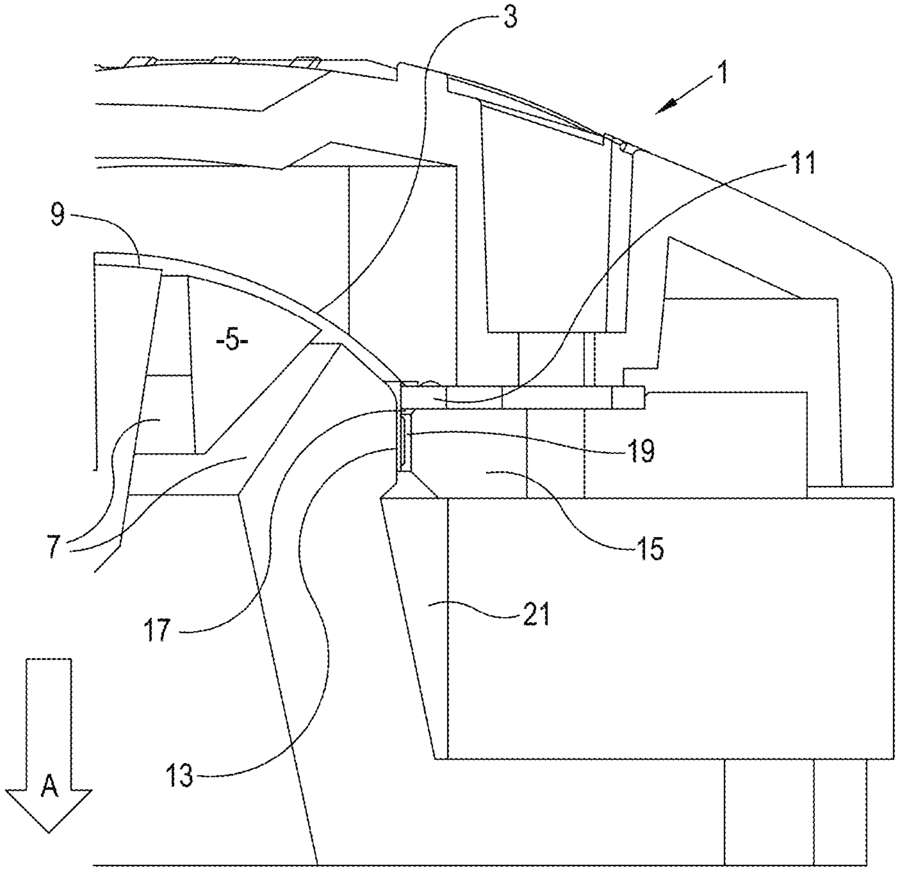
Fig. 1 Prior Art
FIG. 1 is a view of a part of a known compression driver in cross-section.

The prior art arrangement shown in FIG. 1 has been described above.

Figure 2A:
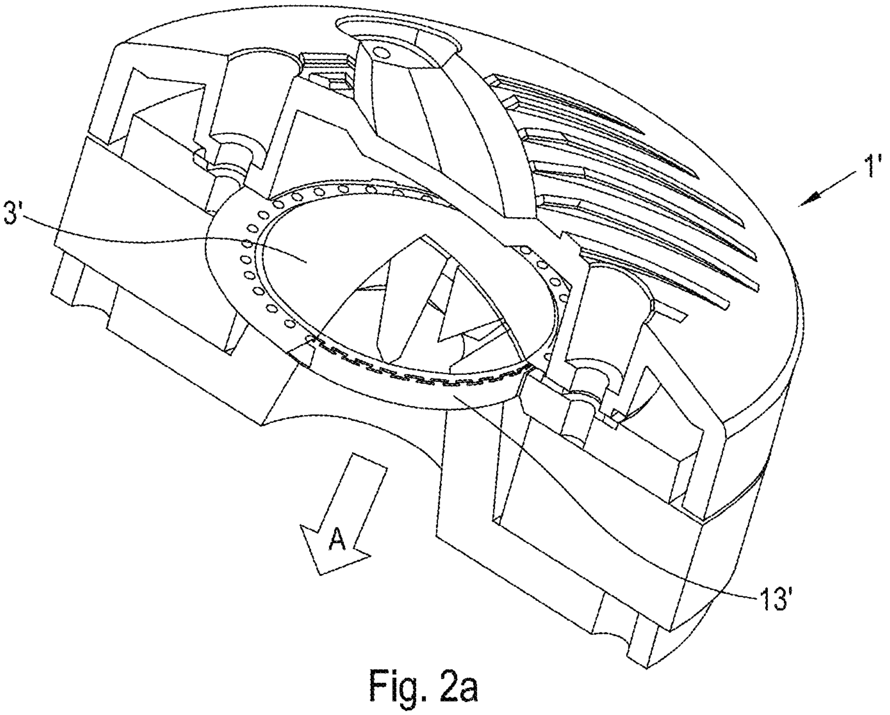
FIG. 2*a* is a schematic illustration, in partial cross-section and partially broken away, of one embodiment of a compression driver in accordance with the present invention.
Figure 2B:
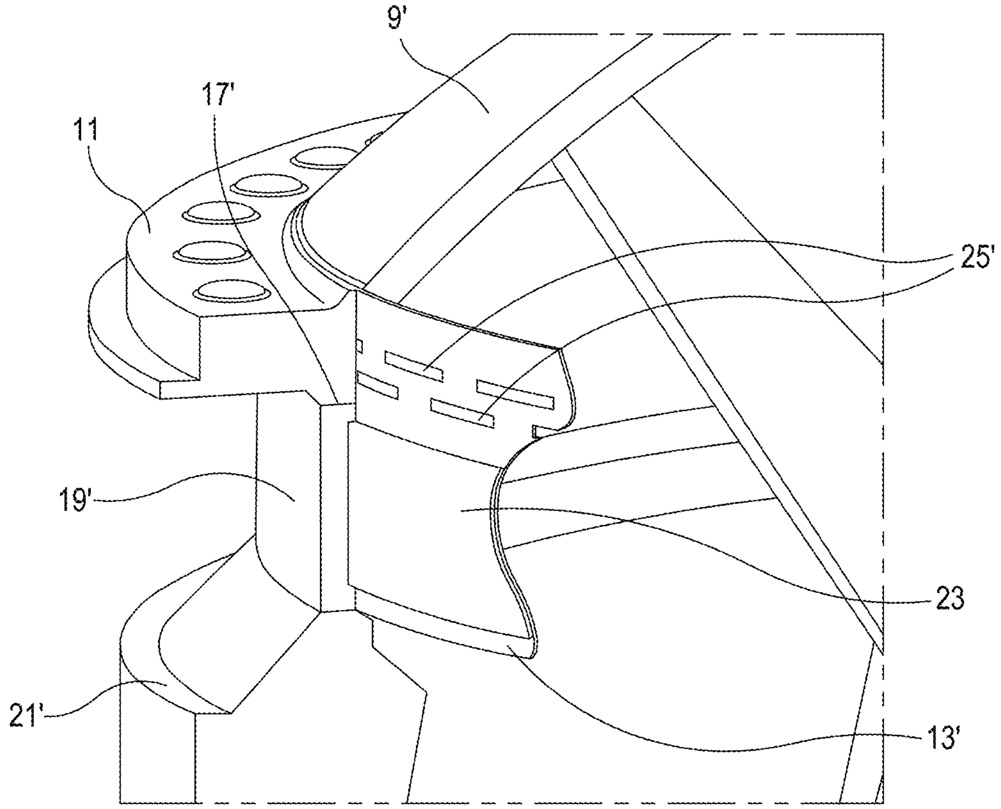
FIG. 2*b* is an enlarged schematic view of part of the compression driver of FIG. 2*a*, showing part of the voice coil former and the cavities within the compression driver.
Figure 2C:
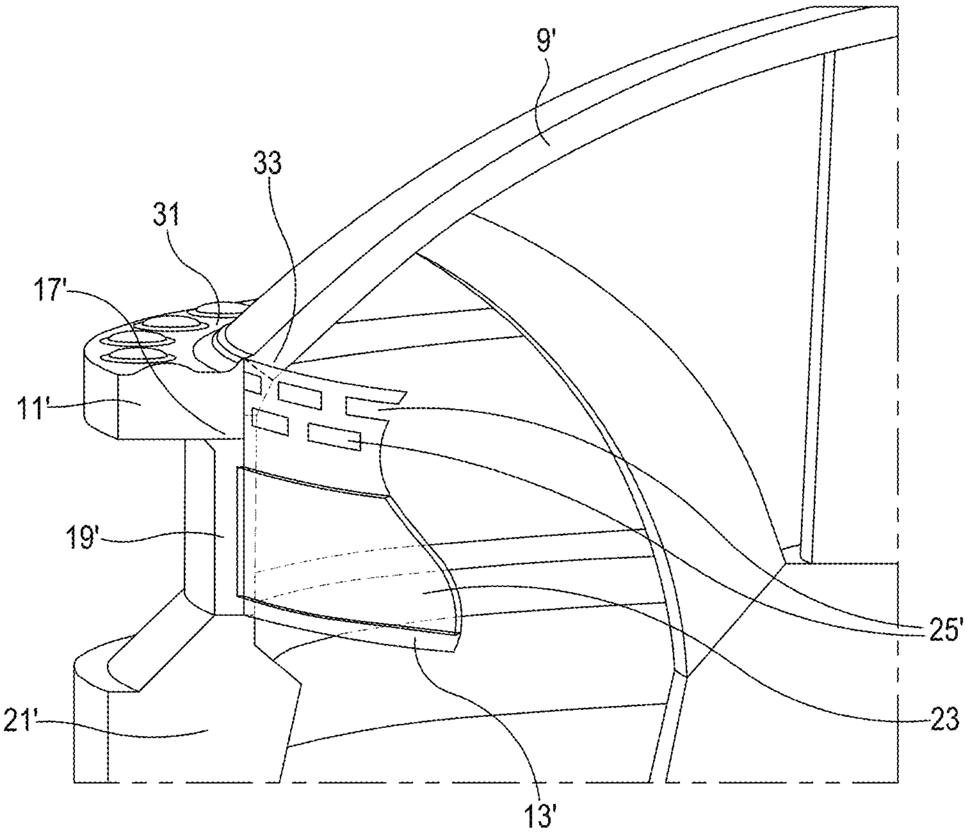
FIG. 2*c* is a view similar to that of FIG. 2*b* but with the voice coil former shown in outline only.
Figure 2D:
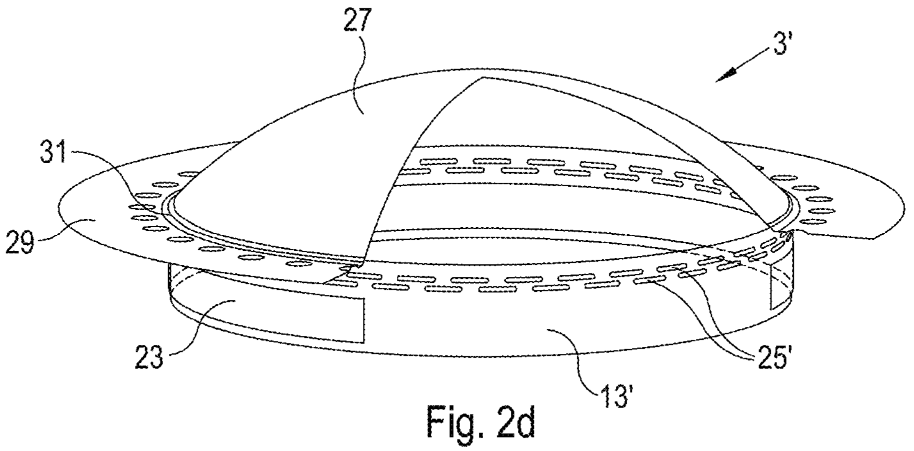
FIG. 2*d* is a schematic view, partly broken away, of the diaphragm and voice coil former of FIG. 2*a;*

FIG. 2*a* shows an embodiment of a compression driver 1' in accordance with the present invention which has a spherically curved diaphragm 3' driven by a cylindrical voice coil former 13' having a plurality of holes 25' arranged around its circumference; this diaphragm 3' is shown in more detail in FIG. 2*d*. The diaphragm 3' is adapted to radiate acoustic waves from its concave surface towards a horn (not shown) in the direction of the arrow A in the conventional manner.

FIGS. 2*b* and 2*c* show only one physical thing, namely part of the voice coil former 13' from FIG. 1 together with the holes 25' passing through it and part of the voice coil 23; in FIG. 2*c* these physical features are shown in outline only. The other features shown in FIGS. 2*b* and 2*c* are mainly volumes, or acoustic pathways, which allow the passage of acoustic waves and which are bounded by the physical parts of the compression driver—these physical parts are omitted from FIG. 2*b* so as to illustrate the present invention more clearly (these physical parts are the diaphragm, phase plug and magnet shown in FIG. 1). These empty volumes are the compression cavity 9', the surround cavity 11', the voice coil cavity 19' and the magnet cavity 21'. The holes 25' are arranged so as to allow the surround cavity 11' and the compression cavity 9' to communicate freely when the compression cavity 9' is at its greatest volume (i.e. when the diaphragm is at its maximum positive excursion, which is when the voice coil former 13' is displaced to its maximum extent upwardly in the drawing).

Referring now to FIG. 2*c*, a dotted line 33 denotes the shortest distance between the diaphragm and the phase plug at the radius line 31 (described below in relation to FIG. 2*d*); in the case of the spherically-curved diaphragm and phase plug of FIG. 2*a*, the line 33 is perpendicular to both the concave, sound-radiating surface of the former and to the convex surface of the other. The line 33 when rotated 360° about the axis A of the compression driver generates an abstract conic surface in the form of a frustum. The total area of all of the holes 25' in the voice coil former 13' is substantially the same as the area of the abstract conic surface (i.e. the curved surface of the frustum). This arrangement effectively extends the compression cavity, by providing an alternative acoustic path (through the holes in the voice coil former and the voice coil cavity to the magnet cavity), which significantly reduces acoustic excitation in the gap.

FIG. 2*d* shows the compression driver diaphragm 3' and voice coil former 13' of FIG. 2*a* which, with the exception of the holes 25' (which are described in more detail below with reference to FIGS. 5*a* and 5*b*), is similar to the diaphragm assembly disclosed in our EP2952014/U.S. Pat. No. 9,467,782. The diaphragm 3' has an inner spherical part 27 and an outer annular part 29; the transition between the spherical and annular parts is marked by a radius line 31 (which, in the arrangement shown, is a circle). The diaphragm 3' and voice coil former 13' are manufactured separately, and joined together on the side of the concave surface of the diaphragm along the line of the radius line 31 to form a unitary, or one-piece, article. Around the outer circumferential surface of the voice coil former is wound an electrically-conductive voice coil 23 (shown in part only). Between the voice coil 23 and the radius line 31 there are a plurality of holes 25' extending circumferentially around the voice coil former 13'.

Figure 3:
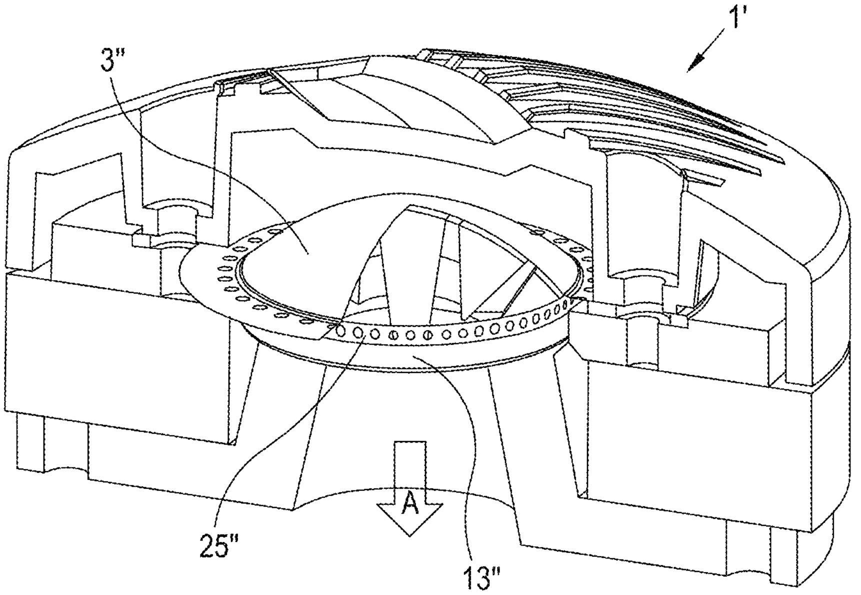
FIG. 3 is a schematic illustration, in partial cross-section and partially broken away, of a compression driver in accordance with the invention similar to FIG. 2*a* but having a different diaphragm assembly.

FIG. 3 shows a compression driver 1' having a different diaphragm assembly 3", in which the two rows of slot-shaped holes 25' in the voice coil former 3' of FIG. 2*d* are replaced in the former 13" by a single row of circular holes 25", again with the total area of all of the holes adding up to the same area as that of the area of the abstract conic surface. Unlike the holes in FIGS. 2*a*, 2*b*, 2*c* and 2*d*, the holes in FIG. 3 do not provide axial mechanical compliance (compression and extension); axial compliance is described below with reference to FIGS. 5*a* and 5*b*.

Figure 4A:
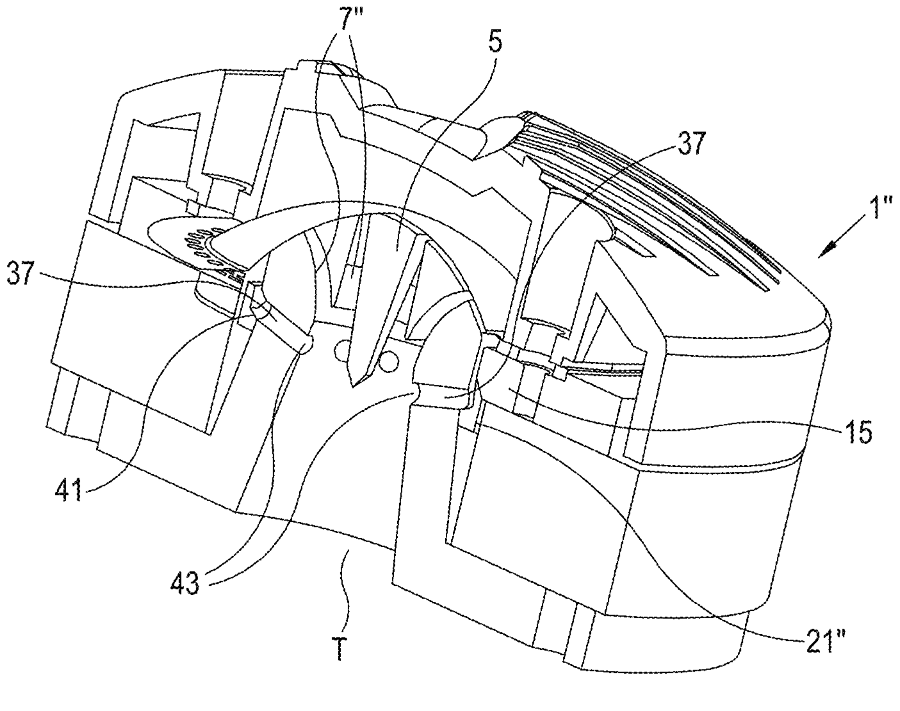
FIGS. 4*a* and 4*b* are schematic views of a second embodiment of a compression driver in partial cross-section in accordance with the present invention.
Figure 4B:
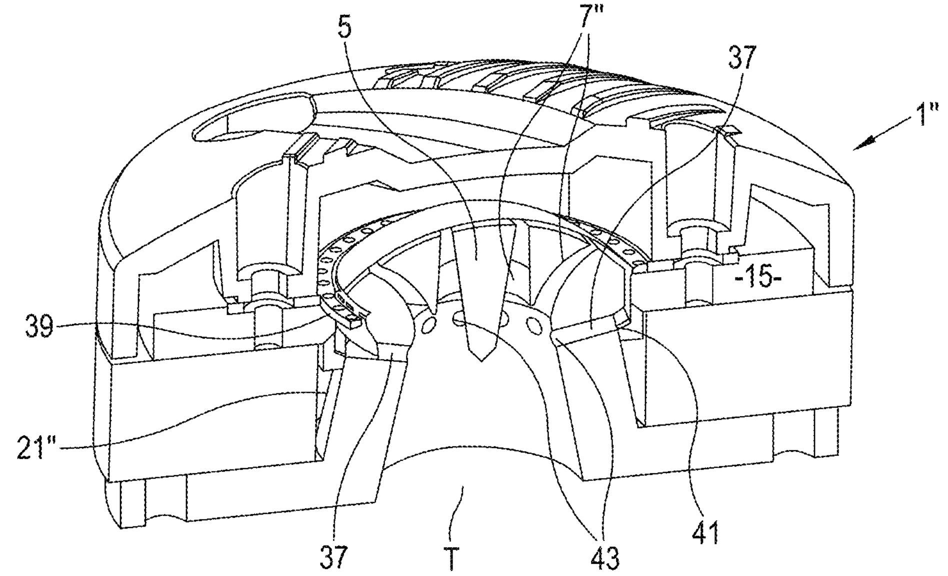
Figure 4C:
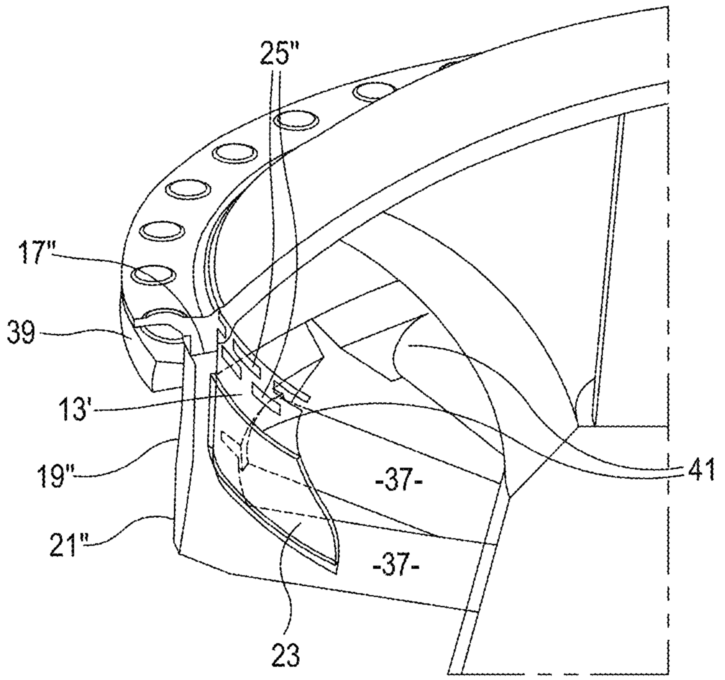
FIG. 4*c* is an enlarged schematic view of part of the compression driver of FIGS. 4*a* and 4*b*, showing part of the voice coil former and a moulding in outline and the cavities within the compression driver.

FIGS. 4*a* and 4*b* are of a compression driver 1" which differs from that of FIG. 2*a* in two respects. Firstly, a plurality of channels 37 is provided which extend through the phase plug 5 from an inlet 41 to an outlet 43 to allow the magnet cavity 21" to communicate directly with the throat T of the phase plug 5 and, secondly, a moulding 39 (see FIGS. 4*b* and 4*c*) is provided to fit within the surround cavity (11 in FIG. 1, 11' in FIG. 2*c*); the moulding 39 forms a cavity which is an extension of the voice coil cavity 19". The magnet cavity 21" is still shown in the drawing, but is now isolated from the acoustic path. FIG. 4*c* shows only two physical things, namely part of the voice coil former 13' from FIG. 2*a* together with the holes 25' passing through it, part of the voice coil 23, and the moulding 39; in FIG. 4*c* these physical features are shown in outline only. The other features shown in FIG. 4*c* are mainly volumes, or acoustic pathways, which allow the passage of acoustic waves and which are bounded by the physical parts of the compression driver—these physical parts are omitted from FIG. 2*b* so as to illustrate these two aspects of the present invention more clearly (these physical parts are the diaphragm, phase plug and magnet shown in FIG. 1).

Adding the channels 37 allows sound to be transmitted through the magnetic gap 17", making the magnetic gap 17" into another acoustic exit channel. It is preferrable to match the flare rate of the path through the channels with that of the other phase plug channels 7", which means that the volume and/or shape of the magnet cavity 21" and the volumes of the channels 37 are adjusted to match the flare rate of the flow path through all of the other phase plug channels 7" (it will be seen from the drawings that the magnet cavity 21" in FIG. 4*c* is both shorter in the axial direction than that in FIG. 2*a* and that it is shaped to reduce in area towards the inlet 41 to each channel). In this case, the acoustic waves generated by the diaphragm travel down both parts of the voice coil former cavity 19" (the outer part extending between the outside of the voice coil former 13' and the magnet 15 and an inner part extending between the inside of the voice coil former 13' and the phase plug 5). In practice the radius of the inner part of the voice coil ranges from about 0.15 mm to about 0.25 mm and the radius of the outer part of the voice coil cavity is between about 0.25 and 0.35 mm. This approach is similar to the use of the gap as a phase corrector channel in U.S. Pat. No. 5,117,462 but has the benefits of allowing the magnetic flux to pass through iron rather than air in the channel extending from the magnetic gap, and of allowing the compression driver to emit increased amounts of HF acoustic energy. The channel outlets 43 are located on a node to allow simple modal balancing, or can be located on alternate axial sides of the nodes, and can also be made larger or smaller (so that the channels taper) as the application demands.

The moulding 39 has two separate functions which can be incorporated in all embodiments in combination or separately: to make the axial length of the surround cavity (11 in FIG. 1) adjacent the magnetic gap (17 in FIG. 1) the same length as the radius of the magnetic gap, and to make the surround cavity reduce in a gradual taper giving an equal excitation of acoustic pressure across the diaphragm surface'. In some applications, the magnet cavity may be made equal to the area of the voice coil cavity.

Figure 5A:
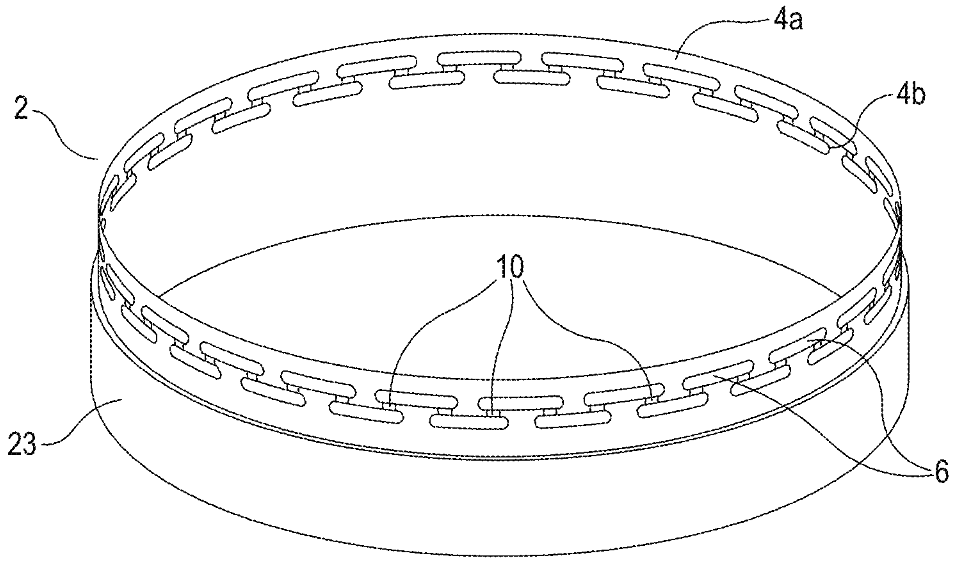
FIG. 5*a* is a schematic illustration of the voice coil former of FIGS. 2*a* to 2*d*.
Figure 5B:
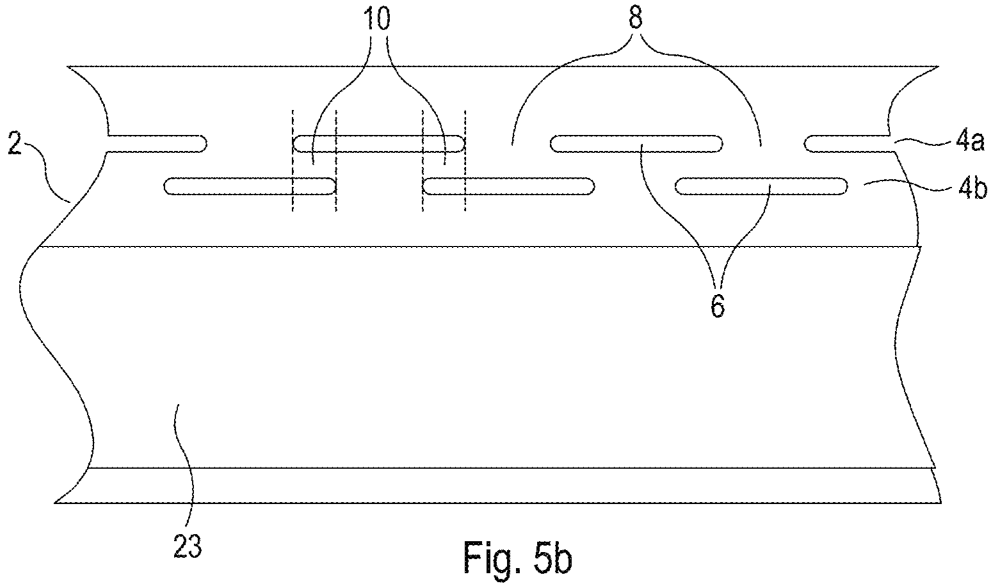
FIG. 5*b* is an enlarged view of part of the voice coil bobbin of FIG. 5*a* 5*b* are enlarged schematic views of part of alternative voice coil formers.

FIG. 5*a* shows a voice coil former 2*a* similar to that in FIGS. 2*a* to 2*c* in having two, axially spaced rows 4*a*, 4*b* of holes 6, each hole 6 having the shape of a slot formed by two half-circles joined by straight edges, where the straight edges extend circumferentially. In this example, the former is 0.025 mm thick titanium, rolled into a cylinder approximately 34 mm in diameter, and there are 28 holes/slots in each row; each slot is approximately 2.2 mm long, 0.2 mm wide with a 0.1 mm radius at each end, and is spaced approximately 1.1 mm from the next slot in that row. As shown more clearly in FIG. 4*b*, between adjacent holes 6 in each row is an axially-extending part 8, and the rows 4*a*, 4*b* are rotated relative to each other so that each axially-extending part 8 is aligned with the middle of the closest slot; this forms a circumferentially-extending spar 10 either side of each axially-extending part 8, between the ends of the slots in the two rows where they overlap (the spars 10 are also shown darkly shaded in FIG. 5*a*, although for clarity these do not show the spars extending to the radiused ends of the holes, which is the actual case, as shown in FIG. 5*b*). Each spar is arcuate because it is formed on the surface of a cylinder. In the embodiment shown there are 56 circumferential spars in total (two spars per slot); each spar is 0.7 mm in circumferential length and 0.3 mm in axial depth (i.e. the axial distance (vertical in the drawing) between the two rows 4*a*, 4*b*). The overlap (i.e. the length of each circumferentially-extending arcuate spar) is in this case approximately 27% of the circumferential length of each holes.

By varying the sizes of the slots, their circumferential separation distances and/or the distance between the rows it is possible to vary the axial compliance of this arrangement to suit a particular requirement/application, and this axial compliance can be relatively easily calculated.

Figure 6A:
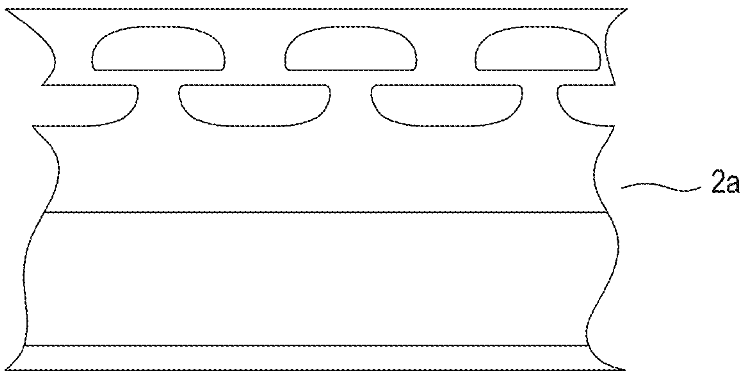
FIGS. 6*a* and 6*b* are enlarged schematic views of part of alternative types of voice coil formers.

FIG. 6*a* shows the enlarged part of a former 2*a* similar to that of FIG. 5*a*, but with differently-shaped holes; provided the side of the perforations adjoining the spars is maintained constant/straight, the shape of the holes has little impact on the stiffness of the spars. In this example a 'D' shaped perforation behaves in almost exactly same manner as the racetrack-shaped holes of FIGS. 4*a* and 4*b*, and the overlap between adjacent holes in adjacent rows is such that the length of the arcuate spars is approximately 27% of the circumferential length of the adjacent holes. The holes could be any shape (e.g. semi-circular, semi-ovoid semi-elliptical) provided the shape of the perforation edges forming the circumferential spars remains substantially constant/straight.

Figure 6B:
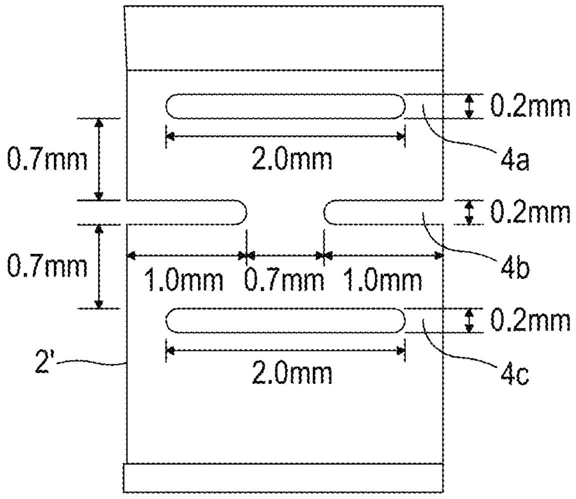

FIG. 6*b* shows a portion of another voice coil former 2' similar to that in FIG. 5*b* but with three rows 4*a*, 4*b*, 4*c* of similarly sized and shaped holes, and with a greater degree of circumferential overlap between holes in adjacent rows (and longer circumferentially-extending arcuate spars) of approximately 33% of the circumferential length of the holes, which provides the voice coil former with a greater amount of axial compliance than the FIG. 5*b* arrangement.

Figure 7:
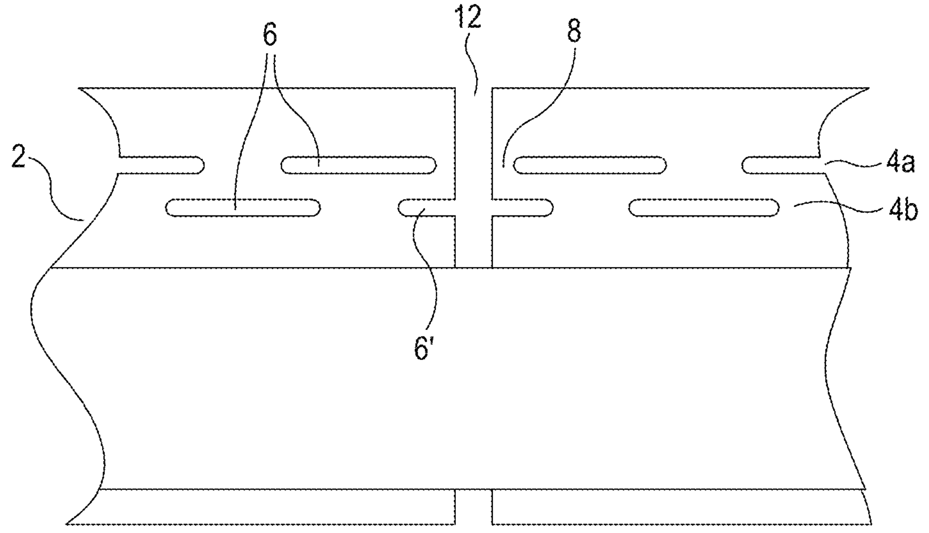
FIG. 7 is an enlarged view of part of the voice coil former of FIGS. 2*a* to 2*d* showing an axial gap extending along the former.

FIG. 7 shows an enlarged view of part of the voice coil former of FIG. 5*b* (but here the overlap between perforations is such that the length of the arcuate spars is approximately 25% of the circumferential length of the adjacent perforations), this time showing an axial gap 12 extending along the former. By ensuring the gap 12 is between the slots, preferably equidistant and bisecting an axially-extending part 8 in one of the rows 4*a* and a slot 6' in the other of the rows 4*b*, a former with flexing spars may be designed so there is little variation in the local axial stiffness around the circumference of the former. If necessary, the length and thickness of spars adjoining the gap in the former may be adjusted to correct any reduction in stiffness due to the change in geometry.

Figure 8:
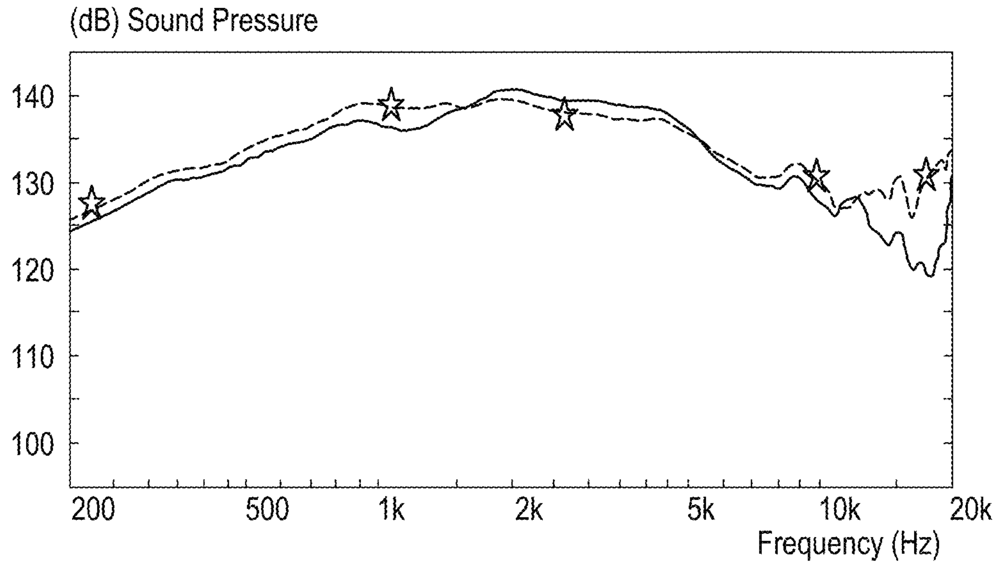
FIG. 8 shows plane wave tube simulation SPL response curves of a compression driver in accordance with the invention (starred curve) and of a conventional compression driver (plain curve).

In FIG. 8, the improved response below 1.7 kHz is due to the modified cavity and the boost to the response above 5 kHz is due to the flexible former design shown in FIG. 4 and patent application. In this example the phase plug was not modified from the original design, and no surround cavity ring was used. Reducing the surround cavity volume and adjusting phase plug channel positions and areas to minimize modal excitation of the compression cavity would further improve the response.

It will of course be understood that many variations may be made to the above-described embodiment without departing from the scope of the present invention. For example, the present invention is principally described herein with reference to cylindrical voice coils (in the form of a substantially planar ring with a central hole extending along an axis perpendicular to the plane); however, the invention applies equally to non-circular arrangements, such as oval, elliptical or race track shaped (figure of eight, or triangular/square/polygonal with rounded corners) voice coils, or any shape being symmetrical in one or two orthogonal directions lying in the general plane perpendicular to the voice coil axis and having a central hole—it will be understood that, in any such non-circular arrangement, the shape of the abstract surface will not be that of a frustum. The diaphragm is described herein as spherical, but the invention is applicable to any curved, non-spherical diaphragm, e.g. elliptical, parabolic or hyperbolic. In any of the embodiments illustrated, damping material may be provided in some or all of the holes, and/or flexible material which is impervious to air may be provided covering the inner or outer surface of any of the holes which are located within the voice coil cavity. The embodiments of voice coil former and/or diaphragm described are all titanium, but they could be formed of a thermoset or polyimide composite material. The holes which connect the compression cavity with the surround cavity may also be configured to provide flexing arcuate spars which add axial mechanical compliance (as in FIGS. 2, 4, 5 and 6), or they may be configured only to connect the compression cavity with the surround cavity (as in FIG. 3); in the latter case, although the only configuration of holes which is described is the single row of circular holes shown in FIG. 3, it will be understood that different shaped holes (square, lozenge, oval, elliptical or race track shaped (figure of eight, or triangular/square/polygonal with rounded corners) could be used, and/or these holes could be arranged regularly, such as in one, two or more rows, and/or in a matrix, and/or irregularly. The sides of the spars are described above as straight, however provided there are still spars which are capable of flexing with an axial component to give axial compliance, the spars could have any shaped sides, and/or they can be inclined away from the circumferential direction.

Where different variations or alternative arrangements are described above, it should be understood that embodiments of the invention may incorporate such variations and/or alternatives in any combination for different applications, so that the features of different embodiments can be combined to form further embodiments. For example, each circumferential row of holes may contain holes all of the same size, shape and orientation, or any of these features may be varied in a row; additionally or alternatively the holes or the perforations in a row may be regularly spaced apart, or they may be irregularly spaced and in either case the holes or perforations may be of the same length or of different lengths. Any or all of these combinations may equally be applied to a voice coil former having three or more rows of hole and/or perforations. The phase plug channels and the moulding described with reference to FIG. 4*c* can be used separately in embodiments of the invention, and do not have to be used in combination. Where axial mechanical compliance is required, the two or more rows of perforations which provide the flexing arcuate spars as in FIGS. 2, 4, 5 and 6 may be located within the voice coil cavity, whilst one, two or more circumferential rows of holes may be provided which pass through the voice coil former to connect the compression cavity with the surround cavity, and these holes may also be perforations of the type which add axial mechanical compliance (as in FIGS. 2, 4, 5 and 6), or they may be of another type (such as in FIG. 3). In brief, all of the variations described in this and the preceding paragraph may be incorporated in any combination in any of the embodiments described in detail herein, every possible combination has not been described for conciseness but these are all comprehensible to the person skilled in the art.

Those skilled in the art will understand that, where attributes, advantages and/o applications are described hereinabove in relation to only one embodiment, these attributes, advantages and applications apply equally to other embodiments which share the same or similar features as the one embodiment described, even though this has not been explicitly stated herein for reasons of conciseness.

The invention claimed is:

1. A compression driver for connection to the throat of an acoustic horn, the compression driver comprising a diaphragm having a concave sound-radiating surface, a phase plug having a convex surface shaped complementarily to match the concave surface of the diaphragm, and a magnet, the diaphragm being connected to a voice coil former along a line forming a closed loop and which lies in a plane, the diaphragm and former being adapted to reciprocate along an axis, the diaphragm, phase plug, voice coil former together being configured to form:

a compression cavity between the concave surface of the diaphragm and the convex surface of the phase plug;

a surround cavity bounded by an outer surface of the voice coil former, an inner surface of the magnet and an edge side of the diaphragm outside the voice coil former;

a magnetic gap transverse to the axis between outer and inner parts of the magnet adjacent the diaphragm through which magnetic gap the voice coil former reciprocates, opening into a voice coil former cavity which extends along the axis away from the magnetic gap, the voice coil former cavity having an outer part extending between the outside of the voice coil former and the magnet and an inner part extending between the inside of the voice coil former and the phase plug, the voice coil former cavity leading from the magnetic gap to a magnet cavity, in which an abstract surface can be generated by rotating about the axis an abstract line extending from the diaphragm on the line of the closed loop to the convex surface of the phase plug perpendicularly thereto, and in which a plurality of holes are formed in the voice coil former around at least a part of its circumference and pass through the voice coil former to connect the compression cavity with the surround cavity, the holes having a total area the same as or greater than the area of the abstract surface.

2. The compression driver according to claim 1, in which the length of the surround cavity in the axial direction is substantially the same as the length of the compression cavity in the axial direction.

3. The compression driver according to claim 1, in which the length of the surround cavity in the axial direction reduces as the surround cavity extends outwardly from the voice coil former in a direction transverse to the axis.

4. The compression driver according to claim 1, in which the holes extend axially by a distance sufficient that at least a part of the holes is contained within the voice coil cavity.

5. The compression driver according to claim 1, in which channels are provided allowing the magnet cavity to communicate directly with the throat of the horn.

6. The compression driver according to claim 5, in which the channels have inlets located in the compression cavity and outlets in the throat of the horn, the inlets being located at a nodal point of a chosen mode in the compression cavity.

7. The compression driver according to claim 1, further comprising a moulding locatable within the surround cavity and effective to modify the axial extent of the surround cavity adjacent the magnetic gap and/or to vary the radial area of the surround cavity so that it decreases in an outward direction.

8. The voice coil former for the compression driver according to claim 1, in which the voice coil former is configured so as to provide at least one row of arcuate spars disposed circumferentially around the voice coil bobbin, each arcuate spar being adapted to flex, cantilever-fashion, in an axial direction in response to the voice coil bobbin being driven axially and allowing the axial length of the voice coil bobbin to vary.

9. The voice coil former according to claim 7, in which there are at least two axially-spaced rows of holes extending circumferentially or at least partly circumferentially around the axis, adjacent rows being rotated relative to each other such that adjacent holes overlap circumferentially to form arcuate spars therebetween disposed circumferentially around the voice coil former, each arcuate spar being adapted to flex, cantilever-fashion, in an axial direction in response to the voice coil former being driven axially and allowing the axial length of the voice coil former to vary, in which the overlap between adjacent holes in adjacent rows is such that the length of the arcuate spars is at least 25% of the circumferential length of the adjacent holes.

10. The voice coil former according to claim 8, in which the overlap between adjacent holes in adjacent rows is such that the length of the arcuate spars is at least 30%, or at least 35%, or at least 40% of the circumferential length of the adjacent holes.

11. The voice coil former according to claim 7, in which the holes are of the same shape.

12. The voice coil former according to claim 7, in which the holes are of the same size.

13. The voice coil former according to claim 7, in while the holes are separated the same distance circumferentially and/or axially.

14. The compression driver comprising the voice coil former according to claim 7.

* * * * *